Nov. 12, 1968 CHI-SHENG LIU 3,411,032

TRANSISTOR TELEVISION DEFLECTION CIRCUITS HAVING PROTECTION MEANS

Filed May 13, 1965

INVENTOR.
CHI-SHENG LIU
BY
Eugene M. Whitacre
Attorney

United States Patent Office 3,411,032

Patented Nov. 12, 1968

3,411,032

TRANSISTOR TELEVISION DEFLECTION CIRCUITS HAVING PROTECTION MEANS

Chi-Sheng Liu, Indianapolis, Ind., assignor to Radio Corporation of America, a corporation of Delaware Filed May 13, 1965, Ser. No. 455,415
8 Claims. (Cl. 315—27)

ABSTRACT OF THE DISCLOSURE

In a television deflection circuit, a protection transistor, biased to a low impedance conductive state, is coupled in series between the B+ supply and the primary winding of an output transformer, the series combination being coupled to the output terminals of a horizontal deflection output transistor. Arcing or other shorting of the transformer drives the protection transistor to a high impedance state to protect the output transistor.

Figure 1:
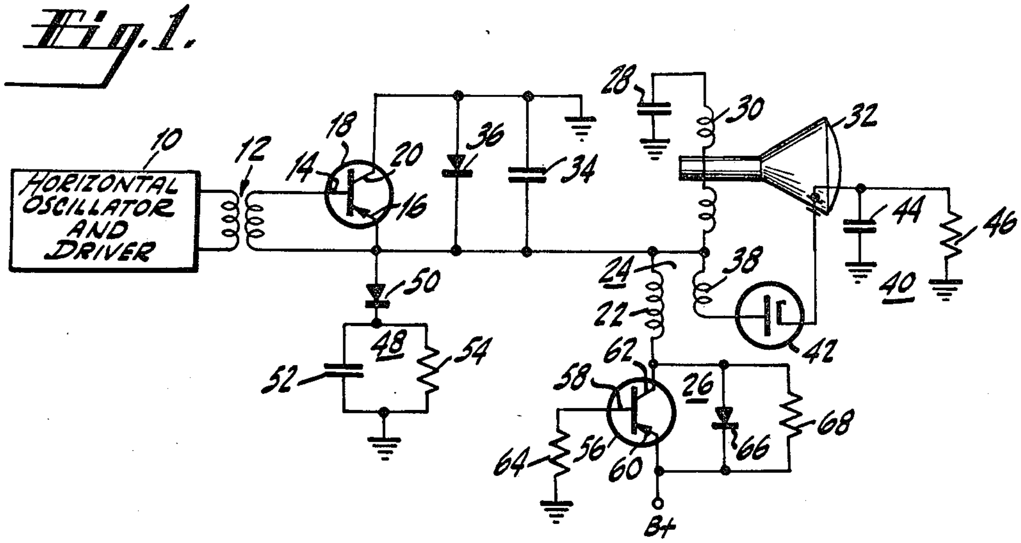

This invention relates to television deflection circuits and in particular to circuit means for protecting a transistor horizontal deflection circuit against current overload conditions.

One of the major problems encountered in transistor horizontal deflection circuits relates to protecting the horizontal output transistor against high energy transients which accompany undesired shorting of any portion of the load circuit of the transistor such as may accompany arcing in an associated high voltage circuit. A typical high voltage circuit includes a step-up flyback transformer coupled to the deflection output transistor for developing high voltage pulses during the retrace portion of each horizontal deflection cycle. A substantially constant low voltage supply is coupled to the horizontal output transistor, for example, by means of the primary winding of the flyback transformer. The typical high voltage circuit further includes the combination of a high voltage rectifier and a filter capacitor, the latter combination being coupled to the secondary winding of the flyback transformer for producing from the high voltage pulses a high direct voltage for application to the image-reproducing kinescope in the television receiver. In accordance with present television receiver design practice, the high voltage filter capacitor advantageously constitutes the capacitance between the inner conductive coating (Aquadag) and the outer conductive coating of the kinescope, the last-named coating normally being coupled to chassis ground. In a circuit of the type described, undesirable arcing may occur across the secondary of the flyback transformer or between either element (cathode or anode) of the high voltage rectifier and ground.

In any of the above-mentioned cases of arcing, the secondary of the flyback transformer is effectively short circuited, substantially reducing the effective series impedance provided across the primary of the transformer between the low voltage supply and the horizontal output transistor. A similar effect is produced when either the transformer primary or deflection yoke (the latter being coupled substantially in parallel with the transformer) is shorted. The resulting decrease in the transistor output impedance causes the current supplied to the transistor (i.e., to the collector-emitter circuit thereof) to increase, driving the transistor out of its normal saturation operating condition. As the transistor is driven out of saturation, the combination of increased emitter-collector current and increased emitter-collector voltage causes failure of the transistor.

It is, accordingly, an object of the present invention to provide an improved combined horizontal deflection and high voltage supply circuit for television receivers wherein the effect upon the horizontal output transistor of arcing in the high voltage supply are substantially reduced.

It is another object of this invention to provide circuit means for protecting a transistor horizontal deflection circuit against failure caused by arcing in an associated high voltage supply.

It is another object of this invention to provide circuit means for protecting a transistor horizontal deflection circuit against failure caused by arcing across an associated high voltage transformer secondary winding.

It is another object of this invention to provide circuit means for maintaining substantially constant the peak current supplied to a horizontal output transistor both during normal operating conditions and during abnormal conditions, the latter resulting for example, from the occurrence of arcing in an associated high voltage circuit.

In accordance with the invention, a transistor deflection and high voltage supply circuit includes a step-up flyback transformer coupled in circuit with a horizontal output transistor amplifier for providing high voltage retrace pulses to a rectifier-filter capacitor combination so as to produce a high direct voltage across the filter capacitor. A relatively low direct voltage supply is coupled in circuit with the output electrodes of the transistor amplifier by means of at least one winding of the flyback transformer. An alternating current load comprising a deflection winding associated with the television kinescope is also coupled in circuit with the output electrodes of the transistor amplifier. Protection means including a transistor normally biased to conduct within the saturation region of its operating characteristic is coupled in series relation with the low direct voltage supply, at least one winding of the flyback transformer and the output electrodes of the output transistor. Upon an increase in the current through the protection transistor, that transistor is driven out of saturation and presents a substantially increased resistance to current flow therethrough.

Figure 2:
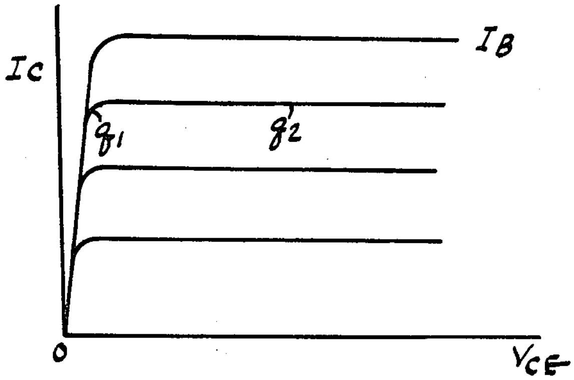

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

FIGURE 1 is a schematic circuit diagram of a portion of a transistor horizontal deflection circuit including a high voltage supply circuit for a television receiver embodying the present invention, and FIGURE 2 illustrates typical transistor collector characteristics applicable to the protection circuit included in the circuit shown in FIGURE 1.

Referring to the drawing, a transistor horizontal deflection and high voltage supply circuit comprises a suitably synchronized horizontal oscillator and driver circuit 10 which may, for example, include a suitable blocking oscillator for generating voltage pulses at the television horizontal scanning frequency (e.g. 15,750 cycles per second). Amplified voltage pulses are coupled by means of a transformer 12 to the input terminals, i.e. base 14 and emitter 16, of a horizontal output transistor 18. The collector 20 of transistor 18 is connected to a point of fixed reference potential such as chassis ground. The emitter 16 is coupled to a relatively low direct voltage supply (B+) by means of the series combination of the primary winding 22 of a flyback transformer 24 and a direct current overload protection circuit 26.

An alternating current load comprising the series combination of an S-shaping capacitor 28 and a horizontal deflection yoke 30, the yoke 30 being associated with an image-reproducing kinescope 32, is coupled between emitter 16 and collector 20 of transistor 18. A retrace capacitor 34 and a damper diode 36 each are coupled between emitter 16 and collector 20.

Flyback transformer 24 includes a secondary voltage step-up winding 38 to which a high voltage generating circuit 40 is coupled. High voltage circuit 40 includes the series combination of a high voltage rectifier 42 and a filter capacitor 44 coupled in the order named between one terminal of secondary winding 38 and ground. The other terminal of secondary winding 38 is coupled to emitter 16. A resistance 46, representative of the varying resistive load of kinescope 32 on high voltage circuit 40, is shown coupled across filter capacitor 44. Filter capacitor 44 advantageously consists of the capacitance between the internal and external conductive coatings of kinescope 32.

A unidirectionally conductive voltage clamping circuit 48 comprising a diode 50 coupled in series with the parallel combination of a storage capacitor 52 and an energy dissipating resistor 54 is also coupled between emitter 16 and collector 20.

The direct current overload protection circuit 26 comprises a transistor 56 having a base terminal 58, an emitter terminal 60 and a collector terminal 62. Collector terminal 62 is connected to the end of primary winding 22 remote from emitter 16 of transistor 18. Emitter terminal 60 is coupled to the low voltage supply (B+) so as to introduce the output or emitter-collector path of transistor 56 in series with the voltage supply (B+), the primary winding 22 and the emitter-collector path of transistor 18. A base-emitter biasing resistor 64 is connected between base terminal 58 and ground potential. The parallel combination of a diode 66 and a relatively small resistor 68 is coupled between collector 62 and emitter 60, diode 66 being poled to conduct in a direction opposite to the normal direction of conduction between emitter 60 and collector 62.

In operation, drive pulses recurring at the horizontal or line scanning frequency are applied from horizontal oscillator and drive circuit 10 via transformer 12 to the base 14 of horizontal output transistor 18. Stated simply, the drive pulses serve to switch the transistor 18 from an "on" or saturation conduction condition at a time during the trace portion of each deflection cycle to an "off" or substantially non-conductive condition during the retrace portion of each deflection cycle. A complete horizontal deflection cycle will be described commencing in the vicinity of the beginning of the retrace portion of the cycle. At the end of the trace portion of each deflection cycle, the current flowing through deflection yoke 30 is supplied by transistor 18. At that time, the yoke current reaches a maximum value in one direction such that the electron beam produced in kinescope 32 is deflected to one extreme edge of the screen thereof. Furthermore, at that time, a relatively small saturation conduction voltage exists between emitter 16 and collector 20 of transistor 18 and therefore appears across each of the circuits connected between those terminals (e.g., diode 36, capacitor 34, the combination of yoke 30 and capacitor 28, etc.). Upon application of a drive pulse to base 14 at the start of the retrace interval, transistor 18 is driven rapidly to a non-conductive or cut-off state. The relatively large current flowing through yoke 30 at the end of trace then flows into retrace capacitor 34. Capacitor 34, yoke 30 and additional circuit reactances associated with the transformer 24 are proportioned such that the current and voltage associated with yoke 30 oscillate through slightly in excess of one-half cycle during the retrace portion of the deflection cycle. During retrace, therefore, the current through deflection yoke 30 reverses in direction so as to deflect the electron beam produced in kinescope 32 to the opposite edge of the screen thereof. A substantially half-sinusoidal voltage pulse is produced across the primary winding 22 of flyback transformer 24 during retrace. This flyback or retrace voltage pulse is stepped up by means of transformer 24 and is applied to high voltage rectifier 42. The stepped-up flyback voltage pulse is rectified and filtered by means of rectifier 42 and the filter capacitor 44 to produce at the high voltage terminal of capacitor 44 a voltage of, for example, 13,000 volts.

When the flyback volatge pulse passes through slightly in excess of one-half cycle of sinusoidal variation, the voltage across capacitor 34 and therefore the voltage across diode 36 is of such a polarity and the current flowing in yoke 28 is in such a direction that substantially all of the linearly increasing yoke current commences to pass through diode 36 in the forward direction. The trace portion of the deflection cycle begins at this time. Diode 36 continues to pass substantially all of the yoke current during the first part of the trace portion of the deflection cycle while a relatively small portion of the yoke current flows in the reverse direction through the substantially nonconductive transistor 18. The yoke current increases in the positive direction (i.e., decreases towards zero from a negative value) and eventually passes through zero, whereupon diode 36 ceases conduction while transistor 18, which by this time is conducting in the forward direction, supplies the linearly increasing yoke current for the remaining portion of the deflection cycle. At the end of the trace portion of the deflection cycle, a drive pulse is again applied to the base 14 of transistor 18 and the deflection cycle is repeated.

Under normal operating conditions of the deflection and high voltage generating circuit described above, the horizontal output transistor 18 conducts in the forward direction only during a fractional part (e.g., about one-half to two-thirds) of the trace portion of each deflection cycle. As noted above, the emitter-collector current of transistor 18 increases in a substantially linear manner from a zero level at a time after the beginning of the trace portion of each deflection cycle to a maximum level at the end of the trace portion of each such cycle. This emitter-collector current may be considered as comprising an increasing direct component provided by the low voltage supply B+ and an alternating component attributable to that portion of the deflection current which flows through deflection winding 30 while transistor 18 conducts in the forward direction. Normally, the peak magnitude of the direct current component is substantially less than the peak value of the alternating current component.

Upon the occurrence of spurious arcing in the high voltage circuit 40 or shorting of primary winding 22, the series impedance seen across primary winding 22 decreases substantially. In the absence of protection circuit 26, the direct current component supplied to transistor 18 would increase substantially, producing a cumulative increase in the peak current flowing through transistor 18 (e.g., from about six amperes peak to peak to about fourteen amperes peak to peak). Transistor 18, normally arranged to operate in the saturation conduction region (i.e., below the "knee") of its characteristic, would be driven out of saturation, producing a substantial increase in emitter-collector voltage. Such a combination of increased transistor output current and increased emitter-collector voltage ordinarily is sufficient to produce failure of transistor 18.

In accordance with the present invention, means are provided for limiting the current supplied to the horizontal output transistor 18 in the event of the occurrence of such a short circuit or arcing in the associated high voltage circuit 40. A direct current limiting means or direct current overload protection circuit 26 is inserted in series relation with low voltage supply B+, transformer winding 22 and the emitter-collector circuit path of transistor 18.

In protection circuit 26, base-emitter biasing resistor 64 is selected such that transistor 56 normally operates at a collector current equal to or slightly less than the current corresponding to a point such as $q_1$ in the saturation conduction region of the collector characteristic shown in FIGURE 2. Under such conditions, transistor 56 presents a relatively low series impedance between low voltage supply B+ and transistor 18, producing negligible effect upon the normal operation of the circuit. Preferably, the operating point $q_1$, is near the knee of the characteristic. However, upon the occurrence, for example, of arcing in high voltage circuit 40 and the consequent reduction in the effective impedance across primary winding 22 as noted above, transistor 56 is driven out of saturation to a point such as $q_2$ on the characteristic shown in FIGURE 2, the particular base current ($I_B$) curve being determined by the base resistor 64 and supply voltage B+. The emitter-collector impedance of transistor 56 increases substantially in that case, effectively replacing the series impedance which previously existed across primary winding 22. The direct current supplied to transistor 18 via transistor 56 remains substantially constant or, at most, increases slightly, thereby maintaining transistor 18 in or near saturation and thereby preventing failure of transistor 18.

It should be noted that although transistor 56 is driven out of saturation upon arcing in high voltage circuit 40, that transistor need only be capable of handling the relatively small increase in direct current (e.g., from about 0.5 to 1.5 amps) whereas, in the absence of transistor 56, horizontal output transistor 18 would be required to handle both that increase in direct current and a resulting increase (e.g., from about 6 to 14 amps peak to peak) in the alternating deflection current. Protection transistor 56, by virtue of its placement in the direct current path to horizontal output transistor 18, is required, upon the occurrence of arcing in high voltage circuit 40, to dissipate only a fraction of the power which would have to be dissipated by transistor 18 in the absence of protection transistor 56.

The relatively small resistor 68 (e.g., ten to twenty ohms) may also be included to bypass a small amount of direct current around protection transistor 56 and thereby reduce the dissipation requirements of that transistor.

Diode 66 is coupled across transistor 56 and poled so as to conduct whenever the voltage at collector 62 exceeds the voltage at emitter 60 in a positive sense, e.g., during the retrace portion of each deflection cycle.

A typical embodiment of the invention such as is shown in FIGURE 1 includes the following components:

B+ voltage supply, 30 volts
Transistor 18, RCA Type TA1928A
Diode 36, RCA Type TA1115
Rectifier 42, Type 1X2
Diode 50, Type 1N3254
Transistor 56, Type 2N301
Diode 66, RCA Type TA1115
Yoke 30, 200 microhenries
Capacitor 28, 3.5 microfarads
Capacitor 44, 500 picofarads
Capacitor 52, .022 microfarads
Resistor 54, 220,000 ohms
Resistor 64, 820 ohms
Resistor 68, 18 ohms

What is claimed is:

1. In a television receiver, a horizontal deflection and high voltage supply circuit for an image-reproducing device comprising:
- a transistor horizontal output amplifier for providing a varying deflection current during each horizontal deflection cycle,
- a horizontal deflection winding responsive to said deflection current coupled to said horizontal output amplifier,
- a direct current supply, a high voltage transformer and direct current overload protection means coupled in series relation to said output amplifier, said protection means comprising a variable impedance having selectable relatively low and relatively high direct current impedance states and being operative, upon a decrease in impedance across said transformer, to provide a compensating increased impedance in series relation between said supply and said output amplifier, thereby preventing failure of said transistor output amplifier.

2. In a television receiver, a horizontal deflection and high voltage supply circuit for an image-reproducing device comprising:
- a transistor horizontal output amplifier for providing a varying deflection current during each horizontal deflection cycle,
- a horizontal deflection winding responsive to said deflection current coupled to said horizontal output amplifier,
- a direct current supply, a high voltage transformer and direct current overload protection means coupled in series relation to said output amplifier,
- a high voltage producing circuit susceptible to spurious arcing coupled to said transformer,
- said protection means comprising a variable impedance having selectable relatively low and relatively high direct current impedance states and being operative, upon the occurrence of such arcing and a consequent decrease in impedance across said transformer, to provide a compensating increased impedance in series relation between said supply and said output amplifier, thereby preventing failure of said transistor output amplifier.

3. In a television receiver, a horizontal deflection and high voltage supply circuit for an image-reproducing device comprising:
- a transistor horizontal output amplifier for providing a varying deflection current during each horizontal deflection cycle,
- a horizontal deflection winding responsive to said deflection current coupled to said horizontal output amplifier,
- a direct current supply, a high voltage transformer and direct current overload protection means coupled in series relation to said output amplifier, said protection means including a protection transistor and biasing means coupled to said protection transistor for maintaining said protection transistor, under normal operating conditions, in a low impedance saturation conduction state in the vicinity of the knee of the operating characteristic of said protection transistor, said protection transistor being operative, upon a decrease in impedance across said transformer, to provide a compensating increased impedance in series relation between said supply and said output amplifier, thereby preventing failure of said transistor output amplifier.

4. In a television receiver, a horizontal deflection and high voltage supply circuit for an image-reproducing device comprising:
- a transistor horizontal output amplifier for providing a varying deflection current during each horizontal deflection cycle,
- a horizontal deflection winding responsive to said deflection current coupled to said horizontal output amplifier,
- a direct current supply, a high voltage transformer and direct current overload protection means coupled in series relation to said output amplifier,
- a high voltage producing circuit susceptible to spurious arcing coupled to said transformer for applying a high direct voltage to said image-reproducing device,
- said protection means including a protection transistor and biasing means coupled to said protection transistor for maintaining said protection transistor, under normal operating conditions, in a low impedance saturation conduction state, said protection transistor being operative, upon the occurrence of such arcing and a consequent decrease in impedance across said transformer to provide a compensating increased impedance in series relation between said supply and said output amplifier, thereby preventing failure of said transistor output amplifier, and a diode coupled across said protection transistor poled to conduct during the retrace portion of each horizontal deflection cycle.

5. In a television receiver, a horizontal deflection and high voltage supply circuit for an image-reproducing device comprising:

a transistor horizontal output amplifier for providing a substantially linearly increasing deflection current during at least a portion of each of successive horizontal deflection cycles, an alternating current load circuit comprising a horizontal deflection winding coupled to said output amplifier and responsive to said deflection current, a direct current supply circuit comprising a flyback transformer, a direct current supply and direct current overload protection means coupled in series relation to said output amplifier.

a high voltage generating circuit susceptible to spurious arcing coupled to said flyback transformer, said protection means comprising a variable impedance having selectable relatively low and relatively high direct current impedance states and being operative, upon the occurrence of arcing in said high voltage circuit and a consequent decrease in the impedance across said transformer, to provide a compensating increased impedance in series relation between said supply and said output amplifier, thereby preventing failure of said output amplifier.

6. In a television receiver, a horizontal deflection and high voltage supply circuit for an image-reproducing device comprising:

a transistor horizontal output amplifier for providing a substantially linearly increasing deflection current during at least a portion of each of successive horizontal deflection cycles, an alternating current load circuit comprising the series combination of a capacitor and a horizontal deflection winding coupled to said output amplifier, a direct current supply circuit comprising a flyback transformer, a direct current supply and direct current overload protection means coupled in series relation separate from said load circuit to said output amplifier, a high voltage generating circuit susceptible to spurious arcing coupled to said flyback transformer, said protection means comprising a variable impedance having selectable relatively low and relatively high direct current impedance states and being operative, upon the occurrence of arcing in said high voltage circuit and a consequent decrease in the impedance across said transformer, to provide a compensating increased impedance in series relation between said supply and said output amplifier, thereby preventing failure of said output amplifier.

7. In a television receiver, a horizontal deflection and high voltage supply circuit for an image-reproducing device comprising:

a transistor horizontal output amplifier for providing a substantially linearly increasing deflection current during at least a portion of each of successive horizontal deflection cycles, an alternating current load circuit comprising the series combination of a capacitor and a horizontal deflection winding coupled to said output amplifier, a direct current supply circuit comprising a flyback transformer, a direct current supply and direct current overload protection means coupled in series relation separate from said load circuit to said output amplifier, a high voltage generating circuit susceptible to spurious arcing coupled to said flyback transformer, said protection means including a protection transistor having base, emitter and collector electrodes and biasing means coupled between said base and emitter electrodes for maintaining the emitter-collector circuit of said protection transistor, under normal operating conditions, in a low impedance saturation conduction state, said emitter-collector circuit being coupled in series relation with said output amplifier, and being operative, upon the occurrence of arcing in said high voltage circuit and a consequent decrease in the impedance across said transformer, to provide a compensating increased impedance in series relation between said supply and said output amplifier, thereby preventing failure of said output amplifier.

8. In a television receiver, a horizontal deflection and high voltage supply circuit for an image-reproducing device comprising:

a transistor horizontal output amplifier, including a first transistor having base, emitter and collector electrodes, for providing a substantially linearly increasing deflection current during at least a portion of each of successive horizontal deflection cycles, an alternating current load circuit comprising the series combination of a capacitor and a horizontal deflection winding coupled between said emitter and collector electrodes and responsive to said deflection current, a direct current supply circuit comprising a flyback transformer, a direct current supply and direct current overload protection means coupled in series relation between said emitter and collector electrodes, a high voltage generating circuit susceptible to spurious arcing coupled to said flyback transformer, said protection means including a second transistor having base, emitter and collector electrodes and biasing means coupled between said base and emitter electrodes for maintaining said second transistor, under normal operating conditions, in a low impedance saturation conduction state, said second transistor being operative, upon the occurrence of arcing in said high voltage circuit and a consequent decrease in the impedance across said transformer, to provide a compensating increased impedance in series relation between said supply and said output amplifier, thereby preventing failure of said output amplifier.

References Cited

UNITED STATES PATENTS 3,343,061 9/1967 Hetterscheid ------- 315—27 X

RODNEY D. BENNETT, *Primary Examiner.*

T. H. TUBBESING, *Assistant Examiner.*